(12) United States Patent
Sandoval-Castillo et al.

(10) Patent No.: US 10,979,881 B2
(45) Date of Patent: Apr. 13, 2021

(54) NFC ENABLED WIRELESS PROCESS COMMUNICATION GATEWAY

(71) Applicant: Rosemount Inc., Shakopee, MN (US)

(72) Inventors: Virgilio D. Sandoval-Castillo, Brooklyn Park, MN (US); Jason Krause, Chaska, MN (US)

(73) Assignee: Rosemount Inc., Shakopee, MN (US)

( * ) Notice: Subject to any disclaimer, the term of this patent is extended or adjusted under 35 U.S.C. 154(b) by 0 days.

(21) Appl. No.: 15/087,133

(22) Filed: Mar. 31, 2016

(65) Prior Publication Data

US 2017/0289736 A1   Oct. 5, 2017

(51) Int. Cl.
*H04B 5/00* (2006.01)
*H04W 4/80* (2018.01)
(Continued)

(52) U.S. Cl.
CPC ............. *H04W 4/80* (2018.02); *H04W 12/04* (2013.01); *H04W 12/50* (2021.01); *H04W 8/005* (2013.01);
(Continued)

(58) Field of Classification Search
CPC ...... H04W 4/008; H04W 88/16; H04W 12/14
(Continued)

(56) References Cited

U.S. PATENT DOCUMENTS

| 8,208,635 | B2 | 6/2012 | Karschnia et al. |
| 8,212,655 | B2 | 7/2012 | Nelson et al. |

(Continued)

FOREIGN PATENT DOCUMENTS

| CN | 102365506 A | 2/2012 |
| CN | 205121279 U | 3/2016 |

(Continued)

OTHER PUBLICATIONS

"Rosemount 752 Foundation TM fieldbus Remote Indicator", Product Data Sheet, Sep. 2014, Emerson Process Management, available at: <www.rosemount.com>.

(Continued)

*Primary Examiner* — April G Gonzales
(74) *Attorney, Agent, or Firm* — Christopher R. Christenson; Kelly, Holt & Christenson PLLC

(57) ABSTRACT

A method for connecting a field device to a wireless process communication network is provided. The method comprises bringing the wireless field device within a proximity of a wireless gateway. The method also comprises establishing a connection between an NFC transceiver associated with the wireless gateway and an NFC tag associated with the wireless field device. The method also comprises generating a near field communication between the wireless gateway and the field device to exchange wireless field device access information. The method also comprises using the wireless field device access information to allow the wireless field device to communicate over the wireless process communication network. A method is also provided for configuring a wireless process communication adapter at a wireless gateway using NFC communication and then subsequently coupling the configured wireless process communication adapter to a field device.

8 Claims, 5 Drawing Sheets

(51) Int. Cl.
*H04W 12/50* (2021.01)
*H04W 12/04* (2021.01)
*H04W 84/18* (2009.01)
*H04W 8/00* (2009.01)
*H04W 12/47* (2021.01)
*H04W 88/16* (2009.01)

(52) U.S. Cl.
CPC .......... *H04W 12/47* (2021.01); *H04W 84/18* (2013.01); *H04W 88/16* (2013.01)

(58) Field of Classification Search
USPC ........................................................ 455/41.1
See application file for complete search history.

(56) References Cited

U.S. PATENT DOCUMENTS

| | | | | |
|---|---|---|---|---|
| 8,766,794 | B2* | 7/2014 | Ferguson | G05B 19/409 340/539.13 |
| 8,818,417 | B2 | 8/2014 | Powell | |
| 8,890,678 | B2 | 11/2014 | Holmstadt | |
| 2007/0015463 | A1* | 1/2007 | Abel | H04B 5/06 455/41.1 |
| 2008/0082698 | A1* | 4/2008 | Schnaare | H04W 12/0471 709/250 |
| 2008/0244714 | A1* | 10/2008 | Kulakowski | G06Q 30/06 705/50 |
| 2009/0311975 | A1* | 12/2009 | Vanderaa | G05B 19/4185 455/90.3 |
| 2010/0290351 | A1* | 11/2010 | Toepke | G05B 19/4185 370/250 |
| 2012/0040698 | A1* | 2/2012 | Ferguson | G06Q 30/0601 455/457 |
| 2012/0230309 | A1* | 9/2012 | Junk | G05B 19/4186 370/338 |
| 2012/0236769 | A1* | 9/2012 | Powell | G05B 19/0426 370/310 |
| 2012/0289155 | A1* | 11/2012 | Dua | H04B 5/0062 455/41.1 |
| 2013/0141888 | A1* | 6/2013 | Wittmer | H05K 7/14 361/818 |
| 2013/0190897 | A1* | 7/2013 | Junk | H04B 5/00 700/12 |
| 2013/0191556 | A1 | 7/2013 | Holmstadt | |
| 2013/0191558 | A1* | 7/2013 | Zitlaw | G06F 9/44 710/52 |
| 2014/0194817 | A1* | 7/2014 | Lee | A61M 5/14228 604/151 |
| 2014/0273895 | A1* | 9/2014 | Korolev | G06K 19/0717 455/114.2 |
| 2014/0277594 | A1* | 9/2014 | Nixon | G05B 15/02 700/17 |
| 2014/0316792 | A1* | 10/2014 | Siddiqui | G16H 40/67 705/2 |
| 2015/0142692 | A1* | 5/2015 | Gillen | G06Q 10/063114 705/330 |
| 2015/0276432 | A1* | 10/2015 | Repyevsky | G05B 19/048 340/870.03 |
| 2015/0280788 | A1* | 10/2015 | Ryu | G09F 9/372 455/41.1 |
| 2015/0373555 | A1* | 12/2015 | Xu | H04L 43/08 370/252 |
| 2016/0182285 | A1* | 6/2016 | Ferguson | H04W 4/06 709/228 |
| 2016/0226922 | A1* | 8/2016 | Russell | H04L 65/1069 |
| 2016/0248738 | A1* | 8/2016 | Brandsma | H04W 12/0431 |
| 2016/0295417 | A1* | 10/2016 | Fujimoto | H04B 7/155 |

FOREIGN PATENT DOCUMENTS

| | | |
|---|---|---|
| EP | 3059919 A1 | 8/2016 |
| JP | 2011504684 A | 2/2011 |
| WO | 2014205243 A1 | 12/2014 |

OTHER PUBLICATIONS

International Search Report and Written Opinion for International Patent Application No. PCT/US2017/023290, dated Jun. 28, 2017, 13 pages.
First Office Action for Chinese Patent Application No. 201610991788.6 dated Oct. 24, 2019, 28 pages with English Translation.
Office Action dated May 21, 2019 for Russian Patent Application No. 2018138198, 17 pages including English translation.
Office Action for Japanese Patent Application No. 2018-551297 dated Sep. 24, 2019, 27 pages with English translation.
Office Action for Canadian Patent Application No. 3,017,632 dated Jul. 26, 2019, 4 pages.
Extended Search Report for European Patent Application No. 17776308.3 dated Aug. 26, 2019, 12 pages.
Decision of Rejection for Japanese Patent Application No. 2018-551297, dated Feb. 12, 2020, 14 pages including English translation.
Second Office Action for Chinese Patent Application 201610991788.6, dated Apr. 22, 2020, 25 pages including English translation.
EPO Communication pursuant to Article 94(3) EPC dated Oct. 30, 2020 for European Patent Application No. 17776308.3, 12 pages.
Third Chinese Office Action dated Nov. 3, 2020 for Chinese Patent Application No. 201610991788.6, 19 pages including English translation.
Indian Examination Report dated Jul. 27, 2020 for Indian Patent Application No. 20182703351, 8 pages.
International Search Report and Written Opinion for International Application No. PCT/US2016/028363 dated Jul. 27, 2016, 17 pages.
Canadian Office Action dated Jul. 22, 2020 for Canadian Application No. 3,017,632, 5 pages.
Communication Pursuant to Article 94(3) for European Application No. 17776308.3, dated May 18, 2020, 9 pages.

* cited by examiner

NFC ENABLED WIRELESS PROCESS COMMUNICATION GATEWAY

BACKGROUND

Any number of field devices may be used in a process installation to monitor one or more ongoing processes. For example, flow meters may monitor flow rates through the installation, while pressure and temperature sensors may provide important pressure and temperature information regarding process fluids at different points through the installation. Other field devices may report other important process variables or sensory data for an operator to monitor an ongoing process. Some examples of process installations include petroleum, pharmaceutical, chemical, pulp, and other fluid processing installations. In such installations, the process control and measurement network may include tens or even hundreds of various field devices which periodically require maintenance to ensure that such devices are functioning properly and/or calibrated.

Some process installations may operate on a wireless network. This may provide advantages during installation and management of the installation as field devices, and installation components, do not require separate network connections to access the network.

When a new wireless field device is installed within a process environment, it must be added to a network through a joining process. In some situations, security is ensured by using a symmetric join key mechanism. The correct join key must be loaded into a field device, such that the wireless field device is accepted by other field devices and the gateway. The join key must be requested from the wireless network, loaded on the field device in a secure fashion, such that another wireless device within range cannot receive and possibly misuse the join key. Although join keys can be loaded manually into each new field device, manual loading can be time-consuming and prone to error.

SUMMARY

A method for connecting a field device to a wireless process communication network is provided. The method comprises bringing the wireless field device within a proximity of a wireless gateway. The method also comprises establishing a connection between an NFC transceiver associated with the wireless gateway and an NFC tag associated with the wireless field device. The method also comprises generating a near field communication between the wireless gateway and the field device to exchange wireless field device access information. The method also comprises using the wireless field device access information to allow the wireless field device to communicate over the wireless process communication network. A method is also provided for configuring a wireless process communication adapter at a wireless gateway using NFC communication and then subsequently coupling the configured wireless process communication adapter to a field device.

These and various other features and advantages that characterize the claimed embodiments will become apparent upon reading the following detailed description and upon reviewing the associated drawings.

DETAILED DESCRIPTION OF ILLUSTRATIVE EMBODIMENTS

Figure 1:
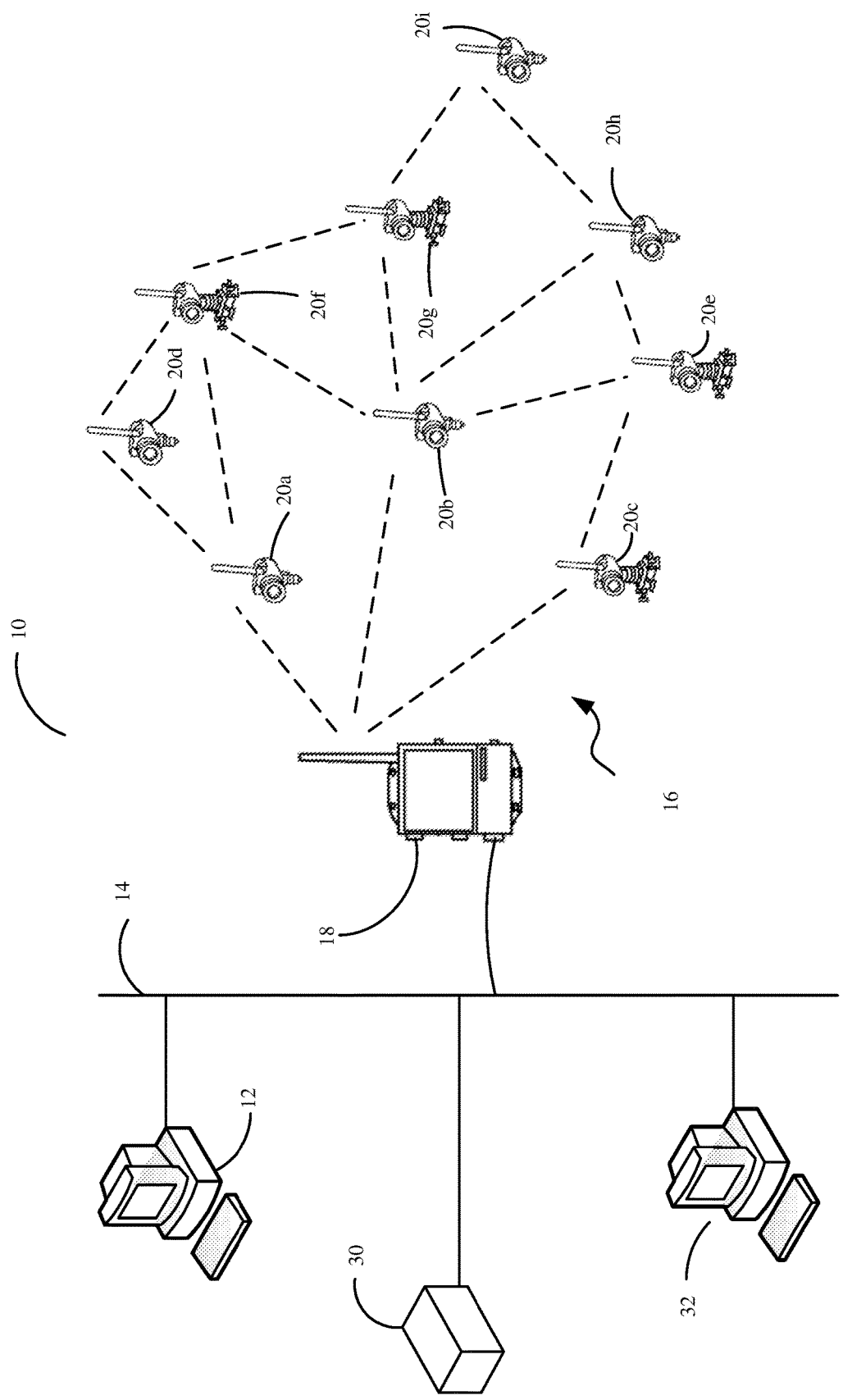
FIG. 1 illustrates an exemplary process control environment in which embodiments of the present invention may be useful.

FIG. 1 illustrates an exemplary process control environment in which embodiments of the present invention may be useful. The process control/monitoring system 10, illustrated in FIG. 1, comprises a host computer 12, a network 14, a wireless network 16, a mobile configuration device 30, and a network computer 32. In one embodiment, the network 14 is a high speed network. In one embodiment, wireless network 16 includes a gateway 18 and a plurality of wireless field devices, or nodes, 20a-20i. However, in another embodiment, at least some of field devices 20a-20i may be hardwired into at least part of network 14.

Gateway 18, in one embodiment, interfaces with both wireless network 16 and a host computer 12 over high speed network 14. In one embodiment, wireless network 16 is a wireless mesh network. Messages may be transmitted from host computer 12 to gateway 18 over network 14, and then, in one embodiment, are transmitted to a selected node of network 16 over one of several different paths. Similarly, messages originating from individual nodes of network 16 are routed through network 16, in one embodiment, from node to node over one of several paths until they arrive at gateway 18, and are then transmitted to host computer 12 over network 14. However, in another embodiment, field devices 20a-20i are able to communicate directly with gateway 18, or directly with either host computer 12 or network computer 32.

Host computer 12, in one embodiment, is a distributed control system host running application programs to facilitate sending information to field devices 20a-20i, as well as analyzing data contained in messages received from field devices 20a-20i. Host computer 12 may use, for example, AMS™ device manager as an application program to allow users to monitor and interact with field devices 20a-20i.

Gateway 18 can communicate with host computer 12 over network 14 using a number of different communication protocols. For example, in one embodiment, network 14 comprises a wired network such as an RS485 two wire communication link. In one embodiment, gateway 18 communicates with host computer 12 using a MODBUS Protocol. However, other suitable communications protocols may be used to facilitate communication between gateway 18 and host computer 12, for example Ethernet, OPC, EtherNet/IP, or HART IP.

Gateway 18 may also serve as a web server (or may have an associated web server), to allow users on network 14 to access field devices 20a-20i of wireless network 16 and to process data received from field devices 20a-20i. The web server allows gateway 18 to be configured using a computer with a standard web browser and a secure Ethernet connection to network 14. User configurable monitoring pages generated by gateway 18 allow measured values from field devices 20a-20i to be grouped and easily viewed within a web interface. The web page generated by gateway 18 can be viewed by accessing network 14 through host computer 12, or another computer or network device (such as computer 32) connected to network 14. An example of a suitable device to perform the functions of gateway 18 is the Rosemount 1420 wireless gateway from Rosemount, Inc. In other embodiments, information may be provided through GUIs in other formats, without the need for web browser and web server. For example, in one embodiment information is provided on an external display associated with host computer 12. In another embodiment, information is displayed on a user interface of a handheld field maintenance tool, for example tool 200 described below.

Wireless network 16 is preferably a low power network in which many of the nodes are powered by long-life batteries or low power energy scavenging power sources. Communication over a wireless network 16 may be provided, in one embodiment, according to a mesh network configuration, in which messages are transmitted from node to node through network 16. In another embodiment, communication over wireless network 16 may involve direct communication from a field device to its intended destination, for example gateway 18 or host computer 12. However, use of a mesh network configuration may allow for the use of low power RF radios, while allowing network 16 to spend significant physical area to deliver messages from one end of the network to another.

In a wired control/monitoring system, interaction between the host computer and the field devices occurs using well-known control messages distributed through a control system communication protocol such as HART®, FOUNDATION™ Fieldbus, Profibus, or another suitable protocol. Field devices capable of use in both wired and wireless systems can make use of control messages according to one of the known control message protocols. In some cases, wireless field devices 20a-20i, which are part of wireless network 16, may not be able to directly exchange these well-known control messages with host computer 12 because the wireless communication over network 16 occurs according to a wireless protocol that is general purpose in nature.

Figure 2:
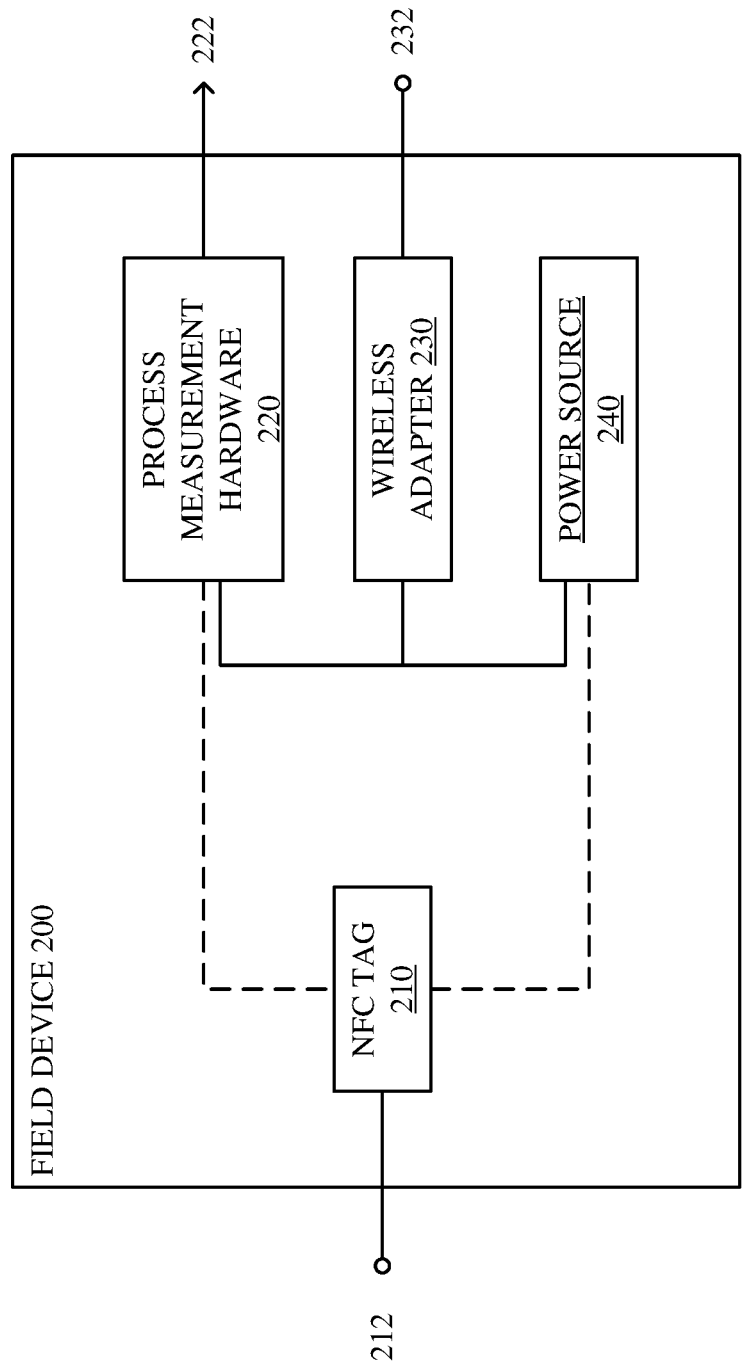
FIG. 2 illustrates a flow diagram of an exemplary process control environment in which embodiments of the present invention may be useful.

FIG. 2 illustrates an exemplary field device in accordance with one embodiment of the present invention. In one embodiment, field device 200 comprises process measurement hardware 220 configured to couple to, and receive sensory indications regarding process variables, from an ongoing process 222 within the process environment. For example, process variable sensory indications may comprise information regarding a process fluid temperature, pressure, flow rate, or other relevant sensory information concerning an ongoing process. Process measurement hardware 220 may be powered by, in one embodiment, power source 240.

In one embodiment, field device 200 comprises a wireless adapter 230, configured to allow field device 200 to communicate with other devices on wireless process communications network 16 using a suitable wireless process communication protocol, such as those in accordance with IEC62591. Wireless adapter 230 may be the primary communication mechanism for field device 200 once field device 200 is connected to network 16. Wireless adapter 230 may allow for communicative coupling, for example between field device 200 and, for example, another device, a handheld field maintenance tool, over network 16.

In one embodiment, field device 200 comprises an NFC tag 210. NFC tag 210, in one embodiment is a passive NFC tag. A passive NFC tag 210 does not have an associated power source, but is configured to draw power from an NFC-coupled device, through an NFC connection, as described in further detail below with regard to FIGS. 3 and 4. In another embodiment, NFC tag 210 is an active NFC tag, and is configured to draw power from a power source within field device 200, such as power source 240.

NFC tag 210 may provide a secondary communication mechanism for field device 200, for example in the event that wireless adapter 230 is not yet configured, or configured improperly.

Figure 3:
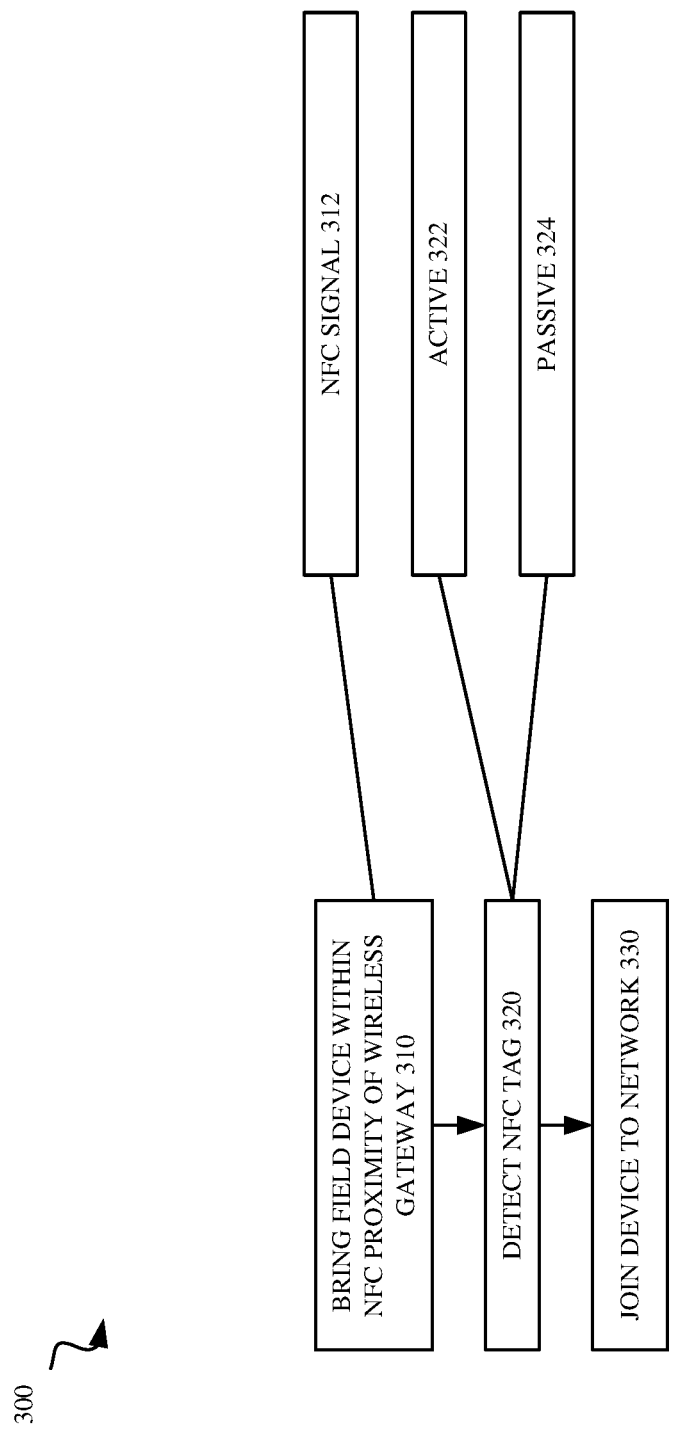
FIG. 3 illustrates an exemplary process controller in accordance with one embodiment of the present invention.

FIG. 3 illustrates an exemplary method for interacting with an NFC-enabled field device in accordance with one embodiment of the present invention. Method 300 may be useful, for example, to initially join a wireless field device to a network.

Method 300 may also be useful, in one embodiment, as a secure verification mechanism to allow access to a field device on a wireless process communication network.

In block 310, a field device is brought into NFC proximity of a wireless gateway having an active NFC transceiver. In one embodiment, the proximity is defined as the maximum distance over which an NFC signal can be received, for example, as indicated in block 312.

In block 320, an NFC tag associated with a wireless field device is detected by an NFC transceiver within a wireless gateway. The detected NFC tag may be an active NFC tag 322 or, in another embodiment, a passive NFC tag 324.

In block 330, a field device is joined to a network. In one embodiment, an NFC transceiver associated with the handheld field maintenance tool communicatively couples with an NFC tag associated with the field device. In one embodiment, the NFC coupling is configured to join the field device to a network, for example by transferring a network key to the field device, and transferring an identification of the field device to the network. In one embodiment, the NFC coupling automatically retrieves and transfers a network join key to the field device, removing the need for a symmetric joining process, while maintaining system security. In one embodiment, the join key comprises a network access key that, when configured, allows the field device to access the network. In one embodiment, the join key also comprises a network identifier. Commissioning a field device can include providing a join key to the field device, and an indication to the wireless gateway that the field device is configured to join the network.

Figure 4:
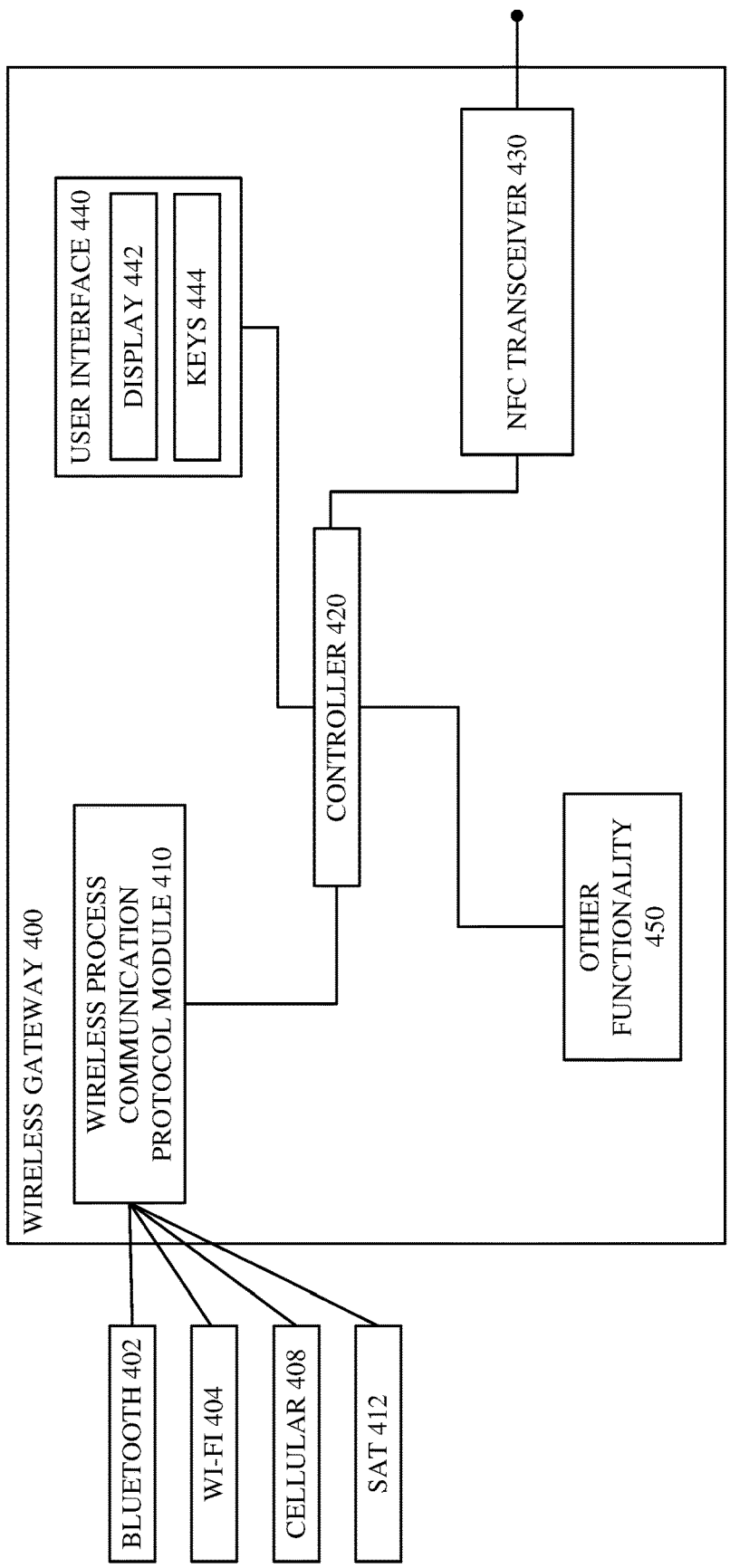
FIG. 4 illustrates an exemplary wireless gateway in accordance with one embodiment of the present invention.

FIG. 4 illustrates an exemplary wireless gateway in accordance with one embodiment of the present invention. Wireless gateway 400 may, in one embodiment, function similarly to gateway 18, described above with respect to FIG. 1. Wireless gateway 400, in one embodiment, comprises a wireless process communication protocol module 410 configured to, for example, communicate with any one of field devices 20a-20i in accordance with a wireless process communication protocol, such as IEC 62591. In some embodiments, wireless process communication module may include additional components or circuitry to communicate in accordance with additional wireless communication protocols, such as Bluetooth 402, Wi-Fi 404, cellular 408, SAT 412, and/or another appropriate wireless communication technology. Wireless gateway 400 may also comprise an NFC transceiver 430, for example, configured to detect a field device 200. In one embodiment, wireless gateway 400 comprises a user interface 440 with a display 442 and input mechanism 444. In one embodiment, input mechanism 444 comprises a set of keys. User interface 440 may be configured, in one embodiment, to receive user input through input mechanism 444, and display an indication, for example through display 442.

Wireless gateway 400 may also comprise a controller 420, configured to, for example, perform at least some of the steps of method 300, discussed above. For example, controller 420 may, upon NFC transceiver 430 detecting a field device 200, confirm that detected field device 200 should have access to a process environment network and, utilizing wireless communication protocol module 410, retrieve a join key from the network, and provide the join key to field device 200 through NFC transceiver 430. In one embodiment, controller 420 retrieves and provides the join key automatically. In one embodiment, in addition to providing a join key, controller 420 may provide other network information. For example, in one embodiment, controller 420 provides the wireless device with a Network ID in order to be added to a "white list" of devices allowed on the network.

Additionally, in one embodiment, the use of NFC technology allows for secure connection of each of a plurality of field devices to a network, without the need for a more complicated joining process involving written or entered join keys. In one embodiment, a secure connection comprises field device 200 in a direct line-of-sight of gateway 400. In one embodiment, a secure connection comprises field device 200 within close proximity of gateway 400. In one embodiment, a secure connection comprises a field device 200 in direct line-of-sight and within close proximity of gateway 400. The secure connection, in one embodiment, allows field device 200 to join the network without obtaining a join key from another device.

In one embodiment, method 300 allows for an operator with a handheld field maintenance tool to connect a field device to a network by an NFC transceiver within the handheld field maintenance tool transferring, for example, a network-generated join key, to the field device, or, for example, field device information to the network. In one embodiment, NFC transceiver 430 is configured to transfer joining information automatically upon detecting an NFC tag, for example NFC tag 210, associated with a field device 200. In at least one embodiment, NFC transceiver 430 is configured to couple, and provide power to an NFC tag within a field device, for example NFC tag 210.

In another embodiment, the NFC connection is configured to provide login information from the handheld field maintenance tool to the field device in order to enable access by the handheld field maintenance tool. Access may be necessary, for example, to perform a diagnostic on the field device. In another embodiment, the NFC connection is configured to receive signals from the field device indicative of process variable measurements received by the field device.

Returning to FIG. 2, in one embodiment, field device 200 is first installed as a wired field device without wireless adapter 230. As technology improves, field device 200 may benefit from a retrofit install of wireless adapter 230 to introduce new wireless communication abilities. In one embodiment, wireless adapter 230 is retrofitted for installation into a previously installed field device 200. Such retrofitting may allow for increased communicable coupling between the field device 200 and the network, for example wireless communication. For example, wireless adapter 230 may be configured to communicably couple field device 200 to the network using, for example, any of NFC, RF, IEEE 802.11b, or another suitable wireless communication protocol. In one embodiment, wireless adapter 230 may be configured to couple with existing electronics within field device 200.

In one embodiment, wireless adapter 230 is preconfigured, for example using NFC technology prior to installation in a pre-existing field device 200. The ability to preconfigure the wireless adapter prior to installation allows for the retrofitted field device 200 to connect to the network as soon as the wireless adapter is installed, instead of requiring an additional joining process in the field.

Wireless adapter 230 may, in one embodiment, be constructed as described in U.S. Pat. No. 8,929,948, configured for connection to, instead of installation within, field device 200.

Figure 5:
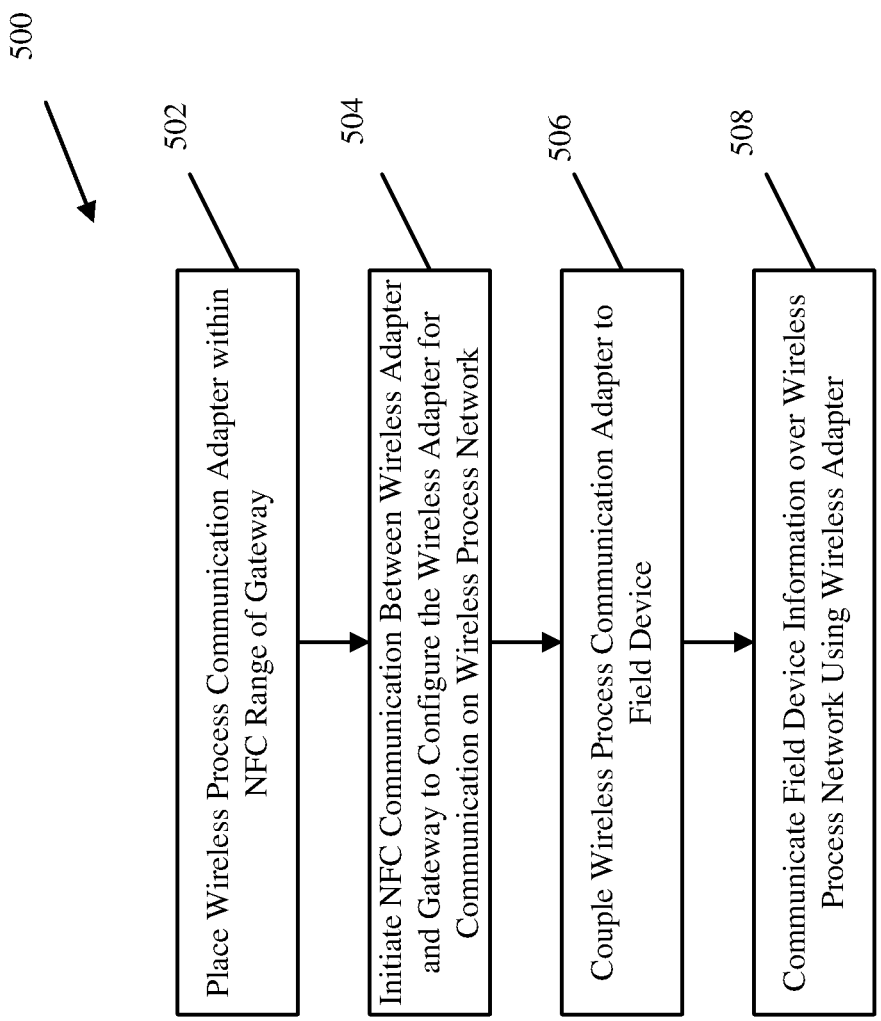
FIG. 5 is a flow diagram of a method of configuring a wireless process communication adapter in accordance with an embodiment of the present invention.

FIG. 5 is a flow diagram of a method of configuring a wireless process communication adapter in accordance with an embodiment of the present invention. Method 500 begins at block 502 where a wireless process communication adapter, such as adapter 230, is brought into NFC range of a wireless gateway, such as gateway 400. The NFC transceiver in the wireless process communication adapter, which may be passive or active, interacts with the NFC transceiver of the gateway and exchanges sufficient information to allow the wireless process communication adapter to communicate on the wireless process communication network, as indicated at block 504. Such information can include the provision of a join key, updating an access control list, et cetera. Next, at block 506, the wireless process communication adapter is physically coupled to a field device, such as field device 200. The field device will typically be coupled to a wired process communication loop or segment, such that the wireless process communication adapter provides the wired field device with the ability to communicate wirelessly over the wireless process communication loop or segment configured at block 504. At block 508, with the wireless process communication adapter coupled to it, the field device communicates over the wireless process communication network configured at block 504.

Although the present invention has been described with reference to preferred embodiments, workers skilled in the art will recognize that changes may be made in form and detail without departing from the spirit and scope of the invention.

What is claimed is:

1. A wireless gateway configured to interact with a field device over a wireless process communication network, the gateway comprising:
    an NFC transceiver configured to detect, and couple to, an NFC tag associated with a field device;
    a controller configured to, upon detection of the NFC tag associated with the field device, automatically communicate an identification of the field device over the network, automatically retrieve a network join key over the wireless process communication network and automatically provide the retrieved network join key to the field device; and
    a wireless process communication module to communicate over the wireless process communication network with the field device.

2. The wireless gateway of claim 1, wherein the detected NFC tag is an active NFC tag.

3. The wireless gateway of claim 1, wherein the detected NFC tag is a passive NFC tag configured to draw power through the coupling with the NFC transceiver.

4. A method for communicating network utilizing a wireless gateway, the method comprising:
    detecting, with an NFC transceiver associated with the wireless gateway, an NFC tag associated with a wireless field device;
    providing, with the gateway, over the network, identification of the wireless field device obtained from the NFC tag;

retrieving, with the gateway, automatically over the network, a join key for the wireless field device;

providing the join key from the gateway to the wireless field device;

wherein providing the identification of the wireless device, retrieving the join key over the network, and providing the join key to the wireless field device occur automatically in response to the detection of the NFC tag; and communicating with the wireless field device over the network using a wireless process communication protocol.

5. The method of claim 4, wherein the join key is received from a system host computer.

6. The method of claim 4, wherein the join key is received from a network computer.

7. The method of claim 4, and further comprising:
receiving a device identification indication from the wireless field device.

8. A method for connecting an installed non-wireless field device to a wireless process communication network, the method comprising:

bringing a wireless process communication adapter within NFC communication range of a wireless gateway;

establishing a connection between an NFC transceiver associated with the wireless gateway and an NFC tag associated with the wireless process communication adapter;

generating, automatically, a near field communication between the wireless gateway and the wireless process communication adapter to configure the wireless process communication adapter to communicate over the wireless process communication network, wherein the NFC transceiver automatically retrieves an identification of the wireless process communication adapter, and the gateway automatically retrieves, over the wireless process communication network, a join key, and automatically provides the join key to the wireless process communication adapter using the NFC connection; and after configuring the wireless process communication adapter, physically coupling the wireless process communication adapter to the field device to retrofit the field device with wireless process communication using the wireless process communication adapter to enable the field device to communicate over the wireless process communication network.

* * * * *